UNITED STATES PATENT OFFICE.

LOUIS EBERLE, OF ALTOONA, PENNSYLVANIA.

COMPOSITION FOR GILT MOLDINGS.

SPECIFICATION forming part of Letters Patent No. 289,237, dated November 27, 1883.

Application filed May 8, 1883. (No specimens.)

*To all whom it may concern:*

Be it known that I, LOUIS EBERLE, of Altoona, in the county of Blair and State of Pennsylvania, have invented a new and useful Improvement in Composition for Gilt Moldings; and I do hereby declare that the following is a full, clear, and exact description of the same.

The object of my invention is to produce gilt moldings for decorative purposes; and it consists in the composition of materials for gilding or finishing the same.

To make the molding, which must be of a firm and hard texture, I take one pound of rosin, one and one-half pound of linseed-oil, and these I boil together thoroughly for from three to four hours. Then I add one-fourth pound of pulverized marble, and while the mixture is hot it is poured into molds. To gild it I take one-half pound of stick-lac, one-half pound of sandarac, one-eighth pound of galipot, one-eighth pound of gamboge, one-eighth pound of dragon's-blood. These are all mixed in three pints of alcohol and thoroughly agitated for about three hours. Before this is applied the frame or molding must be covered with silver leaf, after which the gilding composition is applied with a brush. To make a bright gilding, the surface should be polished with pumice-stone.

Having thus described my invention, what I claim as new is—

The combination for gilding moldings, consisting of stick-lac, sandarac, galipot, gamboge, dragon's-blood, and alcohol, mixed in or about in the proportions specified.

Witnesses: LOUIS EBERLE.
ANTON SCHELLDTAGF,
GEORGE SCHANDELMEIR.